2,930,845

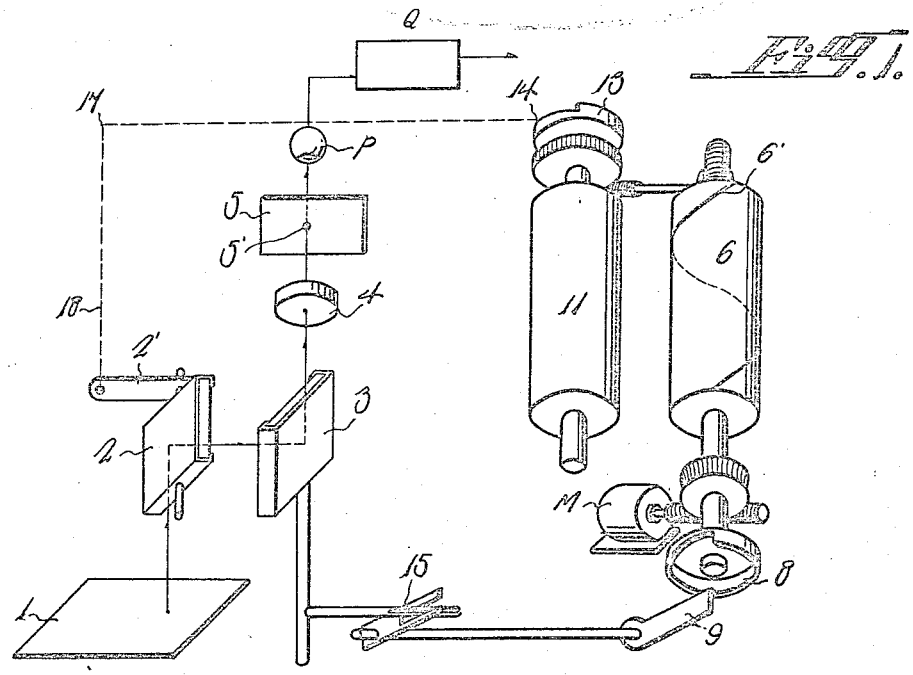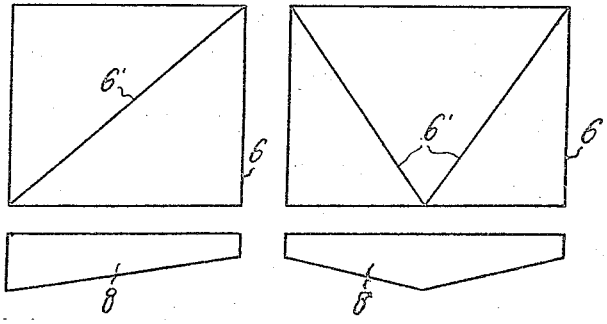

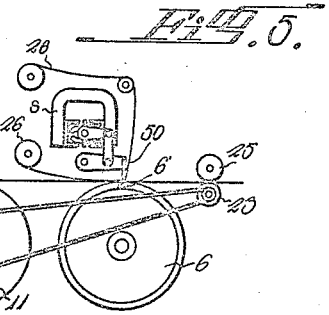
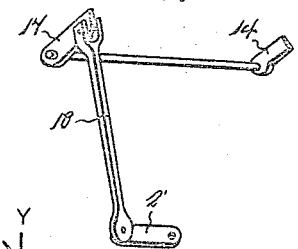
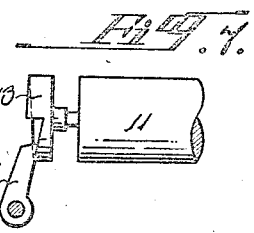
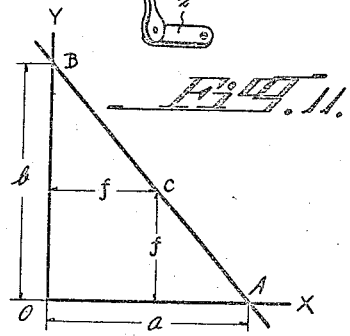
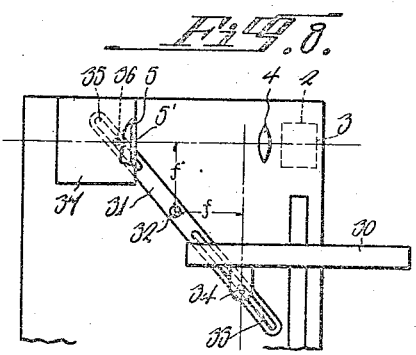
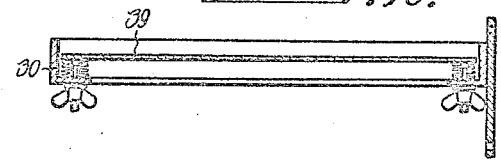
INVENTOR.
Akira Yonemoto

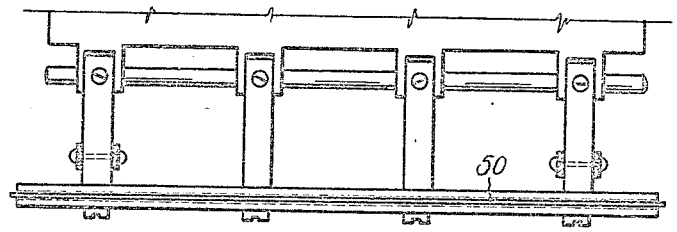
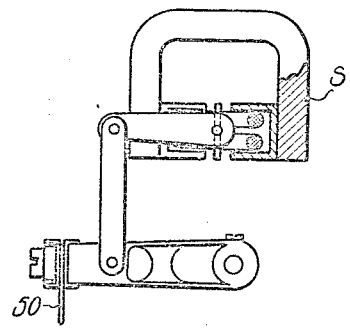
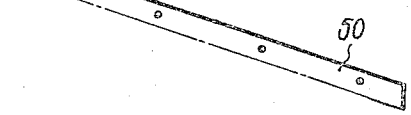
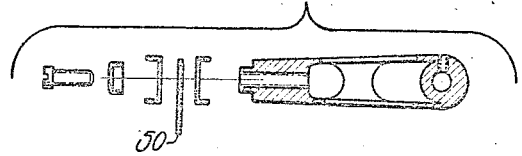

UNIVERSAL DUPLICATOR APPARATUS (PHOTOGRAPHY BY NON-CHEMICAL PROCESS)

Akira Yonemoto, Senpokugun, Japan

Application July 20, 1955, Serial No. 523,339

3 Claims. (Cl. 178—6)

The present invention relates to picture duplicating machines or apparatus for facsimile reproduction of an image on a carrier, such as a sheet, the image being representative of an object or objects, such as documents, pictures, drawings, and the like.

In making copies of documents, pictures and drawings an important object of the invention is to provide a duplicating machine or apparatus which is relatively inexpensive to manufacture and operate, eliminates the need of a darkroom and operations under limited temperature conditions, may be employed in economically copying small jobs as well as large jobs, and checks on the proper operation of the machine or apparatus may be made during the various steps of the duplicating process.

Other objects and advantages of the invention will be apparent during the course of the following detailed description of the invention, taken in connection with the accompanying drawings, forming portions of this specification, and in which drawings:

Fig. 1 is a diagrammatic showing the essential parts of the apparatus of this invention.

Fig. 2 is a flattened out view of the surface of a drum forming a part of the apparatus and a view of the cam facial contour of a cam associated therewith.

Fig. 3 is a modification of the showing in Fig. 2.

Fig. 4 is a perspective view of the actuator of the marking means of the apparatus.

Fig. 5 is a diagrammatic showing a relative position between portions of the apparatus and reproduction paper.

Fig. 6 is a perspective view of a link mechanism for longitudinal scanning.

Fig. 7 is a fragmentary elevation of portions of the showing in Fig. 1.

Fig. 8 is a plan of an automatic focusing device of the apparatus.

Fig. 9 is a side elevation showing a guide pin of an object table of the apparatus.

Fig. 10 is a view mostly in vertical section of the said object table.

Fig. 11 is a graph referred to in the specification in connection with Fig. 8.

Fig. 12 is a bottom plan view of a portion of the marking means of Fig. 5.

Fig. 13 is a side elevation of the marker actuator and associated parts, including a marker.

Fig. 14 is a perspective view of the marker of Fig. 13.

Fig. 15 is a magnified perspective view of a fragment of a second form of marker.

Fig. 16 is an exploded view of the marker of Fig. 14 with means to detachably secure the marker to a link operatively connected with the marker actuator.

Particulars of the embodiment of this invention are given below, referring to the annexed drawings.

The construction of the apparatus of this invention embodies optical, mechanical, and electronical means. The optical means preferably consists of a system of reflectors, as mirrors 2 and 3, a lens 4 disposed in the path of light rays from the mirror 3, an opaque screen 5 containing an opening, as a pin hole 5' at the focusing position, interposed between the lens and a conventional photo-electric converter P such as photo-cell or a photo-diode. The electronic means Q for association with the apparatus includes conventional signal transmitting means and conventional signal receiving and amplifying means with the latter operatively connected with the windings of marking means S for marking picture elements.

The marking means S' comprises a conventional marker actuator including a magnetically operated armature, a system of links operatively connected therewith and a plurality of parallel oscillating arms linked to the system of links for oscillation upon movements of the armature, and a marker 50 fixedly carried by the free ends of the arms. The marker is preferably of steel and of relative light weight and rigid. For stencil cutting the marker 50 is preferably shaped as in Fig. 15.

Scanning means for transversely scanning an object comprises the rotatable drums 6 and 11, with the drum 6 carrying a helical rib 6" (as of wire secured to its outer periphery and adapted to be contacted by a moving paper web 21), with a suitable inking means, as the ink-carrying ribbon or belt 26 interposed between the web 21 and the free edge of the marker 50. The web may be of conventional carbon paper, of a sturdy grade of paper, in roll form. Suitable rollers as the rollers 23, 24 and 25 are adapted to bear upon the web 21 for maintaining it taut, with the rollers 23 and 25 cooperating at opposite sides of the web and the roller 24 cooperating with the drum 11 to retain the web taut and provide means for moving the web beneath the marker 50. Roller 23 is rotated by drum 11 by means of the belt of Fig. 5.

The operative connection between the scanning means structure of drums 6 and 11 with the optical scanning means structure of mirrors 2 and 3 consist of two systems. They are as follows: The operative connection between the mirror 2 and drum 11 is shown to comprise a lever 2' rigid at one end with the pivot of the mirror 2, and pivotally connected at its other end with the structure of Fig. 6 which comprises the links 18 and 17 and a pivot rigid with the link 17 and rigid with a lever 14 which latter engages the cam face of the cam 13 of Figs. 1 and 7. The cam 13 is rigid with the drum 11 by way of the shaft of drum 11. The operative connection between the mirror 3 and drum 6 is shown in Fig. 1 and comprises a lever 15 rigid at one end with the pivot of the mirror 3 and extending between the bifurcated arms of a lever 15 which is rigid with the pivot of a lever 9 rigidly carried by the pivot and which lever engages the cam face of a cam 8 rigid with the drum 6 by way of the shaft of drum 6, with the cam face being of either the contour of that shown in Fig. 2 or that shown in Fig. 3, depending upon the shape of the rib 6' of Fig. 2 or Fig. 3.

Drum 6 is rotated by the means M which is preferably a conventional electric motor operatively connected with the shaft of the drum 6 by means of a conventional worm and worm wheel, and rotation of drum 11 may be effected by a conventional worm and worm wheel connection between the shafts of the two drums. The linear relation of density between the object and the reproduced picture is determined by the linear characteristics of the photo-electric converter P, the electronic means Q and the marker actuator of the means S. Control of the linear characteristics may be undertaken by well-known technique. Of course, the magnification of voltage is easily controlled by a variable tapped resistance, it means that we can produce the copy in various contrast ratios to the object. It can also be controlled at the low level of density. These characteristics make it possible to control the tone (light and shade) of the reproduced picture.

The electric system of this invention is as follows: The light which passes through the pin hole 5' is modulated by the intensity of the picture elements of the image to be reproduced, because of the shift of image on the screen 5 by the deflexion in the optical path realizes relative scannings of it at the pin hole 5'. Then the light modulated by picture elements is converted into an electric current modulated by said picture elements by the function of photo-electric converter P, and converted by the electronic means Q as a train of signals. The signals reach the coil of the marking means S, and the edge of the marker 50 of blade will mark the picture elements, as the copied picture is reproduced. If the marking pressure is too high, the reproduction paper 21 and ink-belt 26 will be broken. So the limiting mechanism is required, because the unavoidable strong signals will be expected. Strong signals result from circuit noise, synchronizing signals, and irregularity of tone of original. Particularly, such strong noises are likely to be induced when copying from the original of low contrast.

Two way scanning (to and fro) can be realized by changing the location of raised line 6' and curve of cam 8 showing Fig. 3. By this means, 5–15% of time is economized.

The object table and automatic focusing device to be associated with the structure hereinbefore described are as follows:

The table for the object consists of an adjustable rigid bottom plate and a frame. Its purpose is to adjust the copied surface of object various thickness on the focusing plane. The adjustable bottom plate 39 of the table is movable up and down straightly for changing optical magnification. An automatic focusing device is provided to make a machine of this invention more useful. As shown in Fig. 8 the table 30 and photo-cell chamber 37 with a pin hole 5' move straight and are combined with a lever 31 provided with spaced apart slots 33 and 35 to receive the pins 34 and 36 respectively. The principle of the automatic focusing device is as follows: The pin 32 is set at the distance of $f$ (focusing distance) from the transverse axes of pins 34 and 36 which axes form a right angle.

In Fig. 11, if two axes OX, OY cross at right angles, and point C distant from axes OX and OY by $f$, then a straight line, passing through point C, crosses to the axes OX and OY, at the points A and B, whereby the distances $OA=a$ and $OB=b$ are equal to the distances from optical center of lens to an object and an image. Some dimentional adjustment is required by distances between lens 4 and mirror 3 or between mirror 2 and mirror 3. A test lamp (not shown) for checking focus may be provided behind the pin hole 5'. This lamp does not project any light to the photo-electric converter P, and is removed from the optical path at time of operation.

This apparatus is simple in mechanism, inexpensive in price compared with teletypes; moreover the applicable features of this apparatus allow for many useful functions in business establishments, etc. The apparatus is quiet in operation, compact and easy to adjust, and copying may be done to a wide magnification since the adjustable bottom plate is movable up-and-down as desired and, being rigid, it can support loads far in excess of that of a sheet of paper or the like.

Having now particularly described and ascertained the nature of my said invention and in what manner the same is to be performed, I declare that what I claim is:

1. In a duplicating machine for reproducing an image on an elongated sheet, the image being representative of an object, a substantially flat support for said object; first rotating drum means, including a first drum, for longitudinally receiving and advancing said sheet; first cam means, including a cam rotatable with said first drum means at the same speed of rotation as said first drum means, and a cam follower; second rotating drum means, including a second drum, for longitudinally receiving said sheet from said first drum means and advancing said sheet, said second drum means being provided with a drum having a raised peripheral helical edge contacting said sheet; second cam means, including a second cam rotatable with said second drum means at the same speed of rotation as said second drum means and a second cam follower, said cam followers being alike in shape and size; drive means operatively connected with said first and second drum means for rotating said first and second drum means; a photoelectric cell; an object scanning optical system including a first scanning mirror, a second scanning mirror, the reflecting surface of said first scanning mirror being interposed in the path of a light ray from said object, upon said support, and the reflecting surface of said second mirror being interposed in the path of the light ray reflected from said first mirror and reflecting said light ray to said photoelectric cell, and a lens interposed in the path of said ray from said second mirror to said cell; a pivot member for pivoting said first mirror and a lever and link system operatively connected between said pivot member and said first cam for pivoting of said first mirror, upon rotation of said first drum and the cam of said first cam means, for scanning said object; a second pivot member for pivoting said second mirror; means operatively connected between said second pivot member and said second cam follower, for pivoting of said second mirror upon rotation of said second drum and the cam of said second cam means, the cams of said cam means being alike in the shape and length of their cam surfaces; electrical marking means above said sheet and said helical edge and positioned to mark said sheet while said sheet is upon said helical edge; electrical current conducting means electrically connected to and between said cell and said marking means to transmit to said marking means electric signals from said cell and electrically actuate said marking means to mark said sheet; and electrical amplifying means interposed in said electrical current conducting means and actuating said marking means in accordance with the instantaneous intensities of said light rays.

2. In a duplicating machine for reproducing an image on an elongated sheet, the image being representative of an object, a substantially flat support for said object; first rotating drum means, including a first drum, for longitudinally receiving and advancing said sheet; first cam means, including a cam rotatable with said first drum means at the same speed of rotation as said first drum means and fixedly secured to said drum at an end of said drum, and a cam follower; second rotating drum means, including a second drum, for longitudinally receiving said sheet from said first drum means and advancing said sheet, said second drum means being provided with a drum having a raised peripheral helical edge contacting said sheet; second cam means, including a second cam rotatable with said second drum means at the same speed of rotation as said second drum means and fixedly secured to said second drum at an end of said second drum, and a second cam follower, said cam followers being alike in shape and size; drive means operatively connected with said first and second drum means for rotating said first and second drum means; a photoelectric cell; an object scanning optical system including a first scanning mirror, a second scanning mirror, the reflecting surface of said first scanning mirror being interposed in the path of a light ray from said object, upon said support, and the reflecting surface of said second mirror being interposed in the path of the light ray reflected from said first mirror and reflecting said light ray to said photoelectric cell, and a lens interposed in the path of said ray from said second mirror to said cell; a pivot member for pivoting said first mirror and a lever and link system operatively connected between said pivot member and said first cam for pivoting of said first mirror, upon rotation of said first drum and the cam of said first cam means, for scanning said object; a second pivot member for pivoting said second mirror; means operatively connected between said second pivot member and said second cam follower, for pivoting of said second mirror upon rotation of said second drum and the cam of said second cam means; the cams of said cam means being alike in the shape and length of their cam surfaces; electrical marking means above said sheet and said helical edge and positioned to mark said sheet while said sheet is upon said helical edge; electrical current conducting means electrically connected to and between said cell and said marking means to transmit to said marking means electric signals from said cell and electrically actuate said marking means to mark said sheet; and electrical amplifying means interposed in said electrical current conducting means and actuating said marking means in accordance with the instantaneous intensities of said light rays.

3. In a duplicating machine for reproducing an image on an elongated sheet, the image being representative of an object, a substantially flat support for said object; first rotating drum means, including a first drum, for longitudinally receiving and advancing said sheet; first cam means comprising a cam rotatable with said first drum means at the same speed of rotation as said first drum means, and a cam follower; second rotating drum means, including a second drum, for longitudinally receiving said sheet from said first drum means and advancing said sheet, said second drum means being provided with a drum having a raised peripheral helical edge contacting said sheet; second cam means comprising a cam rotatable with said second drum means at the same speed of rotation as said second drum means, and a second cam follower, said cam followers being alike in shape and size; drive means operatively connected with said first and second drum means for rotating said first and second drum means; a photoelectric cell; a housing having a pinhole opening, with said photoelectric cell within said housing and disposed with its photocathode in the path of a light ray passing through said pin-hole; an object scanning optical system including a first scanning mirror, a second scanning mirror, the reflecting surface of said first scanning mirror being interposed in the path of a light ray from said object, upon said support, and the reflecting surface of said second mirror being interposed in the path of the light ray reflected from said first mirror and reflecting said light ray through said pin-hole and to said photocathode of said photoelectric cell, and a lens interposed in the path of said ray from said second mirror to said cell; a pivot member for pivoting said first mirror and a lever and link system operatively connected between said pivot member and said first cam for pivoting of said first mirror, upon rotation of said first drum and the cam of said first cam means, for scanning said object; a second pivot member for pivoting said second mirror; means operatively connected between said second pivot member and said second cam follower, for pivoting of said second mirror upon rotation of said second drum and the cam of said second cam means; the cams of said cam means being alike in the shape and length of their cam surfaces; electrical marking means above said sheet and said helical edge and positioned to mark said sheet while said sheet is upon said helical edge; electrical current conducting means electrically connected to and between said cell and said marking means to transmit to said marking means electric signals from said cell and electrically actuate said marking means to mark said sheet; electrical amplifying means interposed in said electrical current conducting means and actuating said marking means in accordance with the instantaneous intensities of said light rays; a table, having a horizontally-disposed, vertically-reciprocable table top containing said object support providing means for changes in optical magnification; and focusing means for moving said housing into selected positions with respect to said object carried by said table top.

References Cited in the file of this patent

UNITED STATES PATENTS

| | | |
|---|---|---|
| 1,593,639 | Reynolds | July 27, 1926 |
| 2,163,543 | Clothier | June 20, 1939 |
| 2,213,876 | Young | Sept. 3, 1940 |
| 2,262,584 | Herriott | Nov. 11, 1941 |
| 2,287,413 | Bruce | June 23, 1942 |
| 2,510,200 | Thompson | June 6, 1950 |
| 2,546,466 | Marzan | Mar. 27, 1951 |
| 2,709,716 | Haller | May 31, 1955 |